United States Patent Office 3,635,894
Patented Jan. 18, 1972

3,635,894
CURABLE EPOXY RESIN COMPOSITIONS CONTAINING ORGANOIMIDAZOLIUM SALT
Rostyslaw Dowbenko and Carl C. Anderson, Gibsonia, Pa., assignors to PPG Industries, Inc., Pittsburgh, Pa.
No Drawing. Filed Nov. 6, 1969, Ser. No. 874,721
Int. Cl. C08g 30/14
U.S. Cl. 260—47
10 Claims

ABSTRACT OF THE DISCLOSURE

Storage-stable, curable epoxy resin compositions comprise a mixture of an epoxy resin and an organoimidazolium salt. Preferably, the composition includes a nitrogenous compound, such as urea, dicyandiamide, melamines or thioureas. These compositions are storage-stable in the uncured state for long periods of time at room temperature, but can be easily cured at elevated temperatures to provide products having excellent sheer strength, peel strength and other properties. These epoxy resin compositions can be used as coatings, adhesives, potting compounds, in castings and laminates, and for similar purposes.

BACKGROUND OF THE INVENTION

Most conventional epoxy resin compositions are used by combining the epoxy resin and the curing agent therefor at the time of use. Such two-part systems have been necessary because combinations of an epoxy resin with those curing agent which provide an efficient rate of curing are generally not stable enough to be stored for any appreciable periods. That is, the curing agent, in order to be efficient at elevated temperatures, tends to gel the epoxy resin prematurely at normal room temperatures, or at the temperatures which may be encountered during storage. Thus, it has been necessary to store the epoxy resin and the curing agent separately until the time of usage.

It can be seen that the use of a two-part system is undesirable because of the added expense and inconvenience. A further problem is the difficulty in accurately measuring the components at the time of use, thus making it more likely that the products obtained will have inferior properties. Such problems are especially troublesome with epoxy resin compositions used as coatings or adhesives because of the manner in which such materials are normally utilized in industrial as well as domestic applications.

Imidazoles are known to be efficient curing agents for epoxy resins, and epoxy resins cured with imidazoles yield coatings and adhesives having excellent mechanical properties. However, these curing agents cure epoxies at room temperature and thus their use requires a two-part system with the disadvantages noted above.

It has recently been discovered that certain complexes of imidazoles with metal salts provide storage-stable epoxy resin compositions which can be cured at elevated temperatures. The use of such curing agents, as described in copending applications Ser. Nos. 702,528 and 702,531, both filed Feb. 2, 1968, provide a significant advance in this art and make possible the utilization of one-part epoxy resin compositions in many applications for which they were not previously suited. However, the metal salt complexes required in those compositions are not always available and in many cases are difficult and expensive to produce. Alternative storage-stable epoxy resin compositions are therefore needed.

SUMMARY OF THE INVENTION

It has now been found that curable epoxy resin compositions which can be stored for extended periods at room temperature but which are easily cured at elevated temperatures are provided by mixtures of an epoxy resin and an organoimidazolium salt of the formula

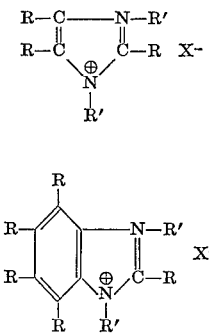

where each R and R' represents hydrogen, alkyl, aryl, or a substituted alkyl or aryl, and X is chloride, bromide, iodide sulfate or phosphate. At least one and preferably both of the groups represented by R' are not hydrogen, i.e., they are alkyl, aryl or a substituted group. These compositions cure at temperatures of about 350° F. in relatively short times and the products obtained have good properties, including those physical and mechanical properties which enable the compositions to be useful as adhesives and coatings, as well as for potting or casting applications and the like.

It has been further found that curing of these compositions is accelerated by including in the composition certain nitrogenous compounds, preferably a triazine, diazine, triazole, guanadine, or guanamine, or a substituted derivative of such compounds.

The epoxy resins to which the invention is applicable includes any epoxy compound or mixture containing oxirane groups. Monoepoxides, as well as polyepoxides, are included, although the preferred epoxy resins are polyglycidyl ethers of polyhydric compounds and other polyepoxides in which the average number of 1,2-epoxy groups per molecule is greater than 1.0.

The amount of organoimidazolium salt ordinarily employed with the epoxy resin can range from about 0.1 to about 25 parts of the organoimidazolium salt per 100 parts of epoxy resin. When a nitrogenous compounds is included in the composition, it is generally employed in an amount corresponding to about 0.1 to about 25 parts per 100 parts of epoxy resin.

DETAILED DESCRIPTION OF THE INVENTION

The compositions of this invention are epoxy resins blended with organoimidazolium salts and, optionally, a nitrogenous compound.

Essentially any epoxy resin can be cured in accordance with the invention by mixing the epoxy resin with the organoimidazolium salt and heating the mixture to an elevated temperature, e.g., between about 200° F. and about 500° F. The term "epoxy resin" as used herein refers to any material, monomeric, polymeric or resinous, which contains oxirane groups and which cures to a hard, infusible, thermoset state. The epoxy may be saturated or unsaturated, aliphatic, cycloaliphatic, heterocyclic or aromatic, and may be substituted, if desired, with substituents such as halogens, sulfur, ester groups, urethane groups, hydroxy groups, mercapto groups, amino groups, ether radicals, acid or acid anhydride groups, ketone or aldehyde groups, or the like. Included are monoepoxides such as propylene oxide, allyl glycidyl ether, glycidyl methacrylate, and the like.

It is preferred, however, that the epoxy resin be a polyepoxide having a 1,2-epoxy equivalency of greater than 1.0, that is, in which the average number of 1,2-epoxy groups per molecule is greater than one. The average number of epoxy groups need not be a whole number and in general is less than four. Such polyepoxides comprise a relatively large class of materials and have been described in numerous patents. Some of these patents are U.S. Pats. Nos. 2,467,171; 2,615,007; 2,716,123; 3,030,336; 3,053,855; and 3,075,999.

Among the polyepoxides which are preferably employed in the present invention are the polyglycidyl ethers of polyphenols such as bisphenol A. These can be obtained, for example, by etherification of a polyphenol with epichlorohydrin or dichlorohydrin in the presence of an alkali. The phenolic compound may be 2,2-bis-(4-hydroxyphenyl)propane, 4,4' - dihydroxybenzophenone, 1,1-bis(4-hydroxyphenyl)-2-methylpropane, 2,2-bis(4-hydroxytertiarybutylphenyl)propane, bis(2 - hydroxynaphthyl)-methane, 1,5-dihydroxynaphthalene, or the like. The polyphenol can also be a novolak resin or similar polyphenol resin.

Also suitable are the analogous polyglycidyl ethers of polyhydric alcohols, which may be derived from such polyhydric alcohols as ethylene glycol, diethylene glycol, triethylene glycol, 1,2-propylene glycol, 1,4-butylene glycol, 1,5-pentane diol, 1,2,6-hexanetriol, glyerol, 2,2-bis(4-hydroxycyclohexyl)-propane, and the like.

There may also be used polyglycidyl esters of polycarboxylic acids, which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthalenedicarboxylic acid, dimerized linolenic acid, or the like. Examples are diglycidyl adipate and diglycidyl phthalate.

The epoxy resins can also be polyepoxide derived from the epoxidation of an olefinically unsaturated alicyclic compound. Included are diepoxides and higher epoxides, as well as mixtures of epoxides comprising in part one or more monoepoxides. These polyepoxides are nonphenolic and are obtained by epoxidation of alicyclic olefins. This is accomplished, for example, by reaction with oxygen and selected metal catalysts, by perbenzoic acid, by acetaldehyde monoperacetate or by peracetic acid.

Other examples of epoxy resins usable in the invention are epoxidized oils, such as epoxidized soybean oil, cycloaliphatic diepoxides, and epoxidized novolak resins obtained by epoxidizing the condensation products of an aldehyde with a polyhydric phenol.

The organimidazolium salts which are mixed with the epoxy resins to provide the curable epoxy resin compsitions of the invention are compounds of the general Formulas I or II above, where each R and R' represents hydrogen alkyl, aryl or substituted alkyl or aryl, at least one of the groups represented by R' being other than hydrogen. R and R' can be, for example methyl, ethyl, propyl, butyl, hexyl, dodecyl or other alkyl; phenyl or other aryl; benzyl, phenylethyl, or other aralkyl; tolyl, ethylphenyl, or other alkaryl; or other substituted alkyl or substituted aryl, such as 2-carbamylethyl. X in the formula is an anion selected from the group consisting of chloride, bromide, iodide sulfate, and phosphate.

Some examples of specific organimidazolium salts of the class described include the following:

1-methylimidazolium chloride
2-methylimidazolium chloride
1-ethylimidazolium chloride
2-butylimidazolium chloride
1-phenylimidazolium chloride
1-butyl-2-methylimidazolium chloride
1-methyl-3-(methoxymethyl)imidazolium chloride
1-methyl-3-benzylimidazolium chloride
1,2-dimethyl-3-benzylimidazolium chloride
1,3-dibenzylimidazolium chloride
1,3-dibenzyl-2-ethylimidazolium chloride
1,3-dibenzylbenzimidazolium chloride
1-benzyl-2-ethyl-3(methoxymethyl)imidazolium chloride
1(2-carbamylethyl)-3-benzylimidazolium chloride
1(2-carbamylethyl)-2-ethyl-3-benzyl-4-methylimidazolium chloride
1-allyl-2-ethyl-3-benzyl-4-methylimidazolium chloride
1(2-carbamylethyl)-2-hexylimidazolium bromide
1-butyl-2-methyl-3-hexylimidazolium bromide
1-benzyl-2-ethyl-3-hexylimidazolium bromide
1,3-dimethylimidazolium iodide
1,2,3-trimethylimidazolium iodide
1-methyl-3-pentylimidazolium iodide
1(2-carbamylethyl)2-ethyl-3,4-dimethylimidazolium iodide
1-benzyl-2-ethyl-3-methylimidazolium iodide
1(2-carbamylethyl)-3-methylimidazolium iodide
1-methylbenzimidazolium iodide
1-methylimidazolium sulfate
1-methylimidazolium phosphate
1,2-dimethylimidazolium sulfate
1,2-dimethylimidazolium phosphate The proportion of the organimidazolium salt employed as the curing agent in the epoxy resin composition is not critical, in that any amount of the curing agent will provide some degree of cure with whatever amount of epoxy material is present. In order to obtain optimum properties, however, various factors must be considered, including the type of epoxy compound, the epoxide equivalent of the epoxy material, the particular organimidazolium salt being employed, and the presence or absence of other additive materials. In most instances, the curable epoxy resin composition contains from about 0.1 to about 25 parts of the curing agent per 100 parts of epoxy resin, with the preferred materials containing from about 0.5 to about 20 parts per 100 parts of epoxy resin.

As mentioned above, it is desirable to include in the curable epoxy resin composition a nitrogenous compound, the mixture of organimidazolium salt and nitrogeneous compound acting synergistically to provide a highly desirable curing system. A number of nitrogenous compounds which act in this manner are described in Ser. No. 702,528, filed Feb. 2, 1968 (the disclosure of which is incorporated herein by reference). The surprising increase in curing rate achieved with the use of such nitrogenous compounds with the complexes described in the copending application has also been found to take place with the curing agents of the present invention. The apparent synergistic effect provided by the use of such compounds with the organoimidazolium salts described above provides curing several times faster than with the organoimidazolium salt alone, without adversely affecting the storage stability of the composition.

The preferred nitrogenous compounds employed herein are diazines, triazines, triazoles, guanidines, guanamines and alkyl and aryl substituted derivatives of such compounds. Some examples of such compounds are N,N'-dimethylurea, benzoylurea, methylolurea, N,N'-dimethylolurea, N-butoxymethyl-N'- hydroxymethylurea, thiourea, N,N'-diethylthiourea, dicyandiamide, formoguanamine, acetoguanamine, benzoguanamine, ammeline, guanazole, carbamylguanazole, melamine, 2 - chloro - 4,6 - diamino-1,3,5 - triazine, 6 - methyl - 2,4-diamino-1,3,5-triazine, 2-phenyl - 4 - amino-6-hydroxy-1,3,5-triazine, 3,5-diamino triazole, 2,4,6 - triaminopyrimidine, 2 - mercapto-4,6-diaminopyromidine, 2,4,6-trihydrazine-1,3,5-triazine, 2,4,6-triethylamino-1,3,5-triazine,3,5-diaminotriazole, 2,4,6-triaminopyrimidine, 2 - mercapto - 4,6 - diaminopyrimidine, 2,4,6 - trihydrazine - 1,3,5-triazine, 2,4-diamino-1,3,5-thiodiazole, and others of this general class.

Since the use of a nitrogenous compound is optional, it can be employed in any amount to provide some accelerating action. However, when such a compound is utilized, it is commonly present in an amount between about 0.1 and about 35 parts per 100 parts of the epoxy resin, preferably between about 5 and about 25 parts.

The organoimidazolium salts utilized as the curing agents herein are produced by known techniques. For example, they can be obtained by alkylation of imidazoles with alkyl halides.

As indicated, the curable epoxy resin composition is provided by mixing and blending the organoimidazolium salt with the epoxy resin (and the nitrogenous compound, if one is employed). These compositions can be stored at room temperature for relatively long periods, e.g. up to about 4 to 6 months or even longer. At the time of use, the compositions are cured by heating the mixture to about 200° F. to about 500° F.; ordinarily the curing temperature employed is about 350° F. At such temperatures the curing reaction is complete in a relatively short time.

In addition to the above components there can also be included in the curable composition various additive materials, including pigments, such as titanium dioxide, carbon black and the like; fillers such as aluminum; flexibilizing agents, etc. There can also be included other resinous materials, which may be coreactive with the epoxy resin if desired. Examples include polycarboxylic acid resins, resins containing anhydride groups, polyesters or other resins containing carboxyl, epoxy, hydroxyl or thio groups, silicone resins, urethane resins and amino resins.

The curable compositions of the invention are useful as coatings, adhesives, potting compounds, castings, laminates, in reinforced products and in similar applications. They can be applied on substrates for use as protective or decorative coatings, or as adhesives to bond essentially any solid laminae. They can in general be utilized in any manner in which one-part epoxy materials are useful.

Set forth below are several examples which illustrate the invention and several of its specific embodiments. However, the invention is not to be construed as being limited to these embodiments, for there are, of course, numerous possible variations and modifications. All parts and percentages in the examples, as well as throughout the specification, are by weight unless otherwise indicated.

For convenience in referring to the organoimidazolium salts in the examples, there are employed letter designations for a number of such compounds, in accordance with the following Table I:

TABLE I

Designation: Compound
- A — 2-methylimidazolium chloride.
- B — 1,2-dimethylimidazolium chloride.
- C — 1,2-dimethyl-3-benzylimidazolium chloride.
- D — 1-methyl-3-benzylimidazolium chloride.
- E — 1-(2-carbamylethyl)imidazolium chloride.
- F — 1-methylimidazolium sulfate.
- G — 1-methylimidazolium chloride.
- H — 1-methylbenzimidazolium iodide.
- I — 1-benzyl - 2 - ethyl-3-(2-carbamylethyl)-4-methylimidazolium chloride.
- J — 1-methyl - 2 - ethyl-3-(2-carbamylethyl)-4-methylimidazolium chloride.
- K — 1,3-dibenzylimidazolium chloride.
- L — 1-allyl-2-ethyl - 3 - benzyl-4-methylimidazolium chloride.
- M — 1,3-dibenzyl-2-ethylimidazolium chloride.
- N — 1-methyl - 3 - (methoxymethyl)imidazolium chloride.
- O — 1-benzyl-2-ethyl - 3 - hexylimidazolium bromide.

Designation: Compound
- P — 1 - butyl-2-methyl - 3 - hexylimidazolium bromide.
- Q — 1-benzyl-2-ethyl - 3 - (methoxymethyl)imidazolium chloride.
- R — 1-(2-carbamylethyl) - 3 - hexylimidazolium bromide.
- S — 1-benzyl - 3 - (2 - carbamylethyl)imidazoluim chloride.
- T — 1-methyl-3-pentylimidazolium iodide.
- U — 1,3-dibenzylbenzimidazolium chloride.
- V — 1-benzyl-2-ethyl - 3 - methylimidazolium iodide.
- X — 1,2,3-trimethylimidazolium iodide.
- Z — 1,3-dimethylimidazolium iodide.
- Y — 1-(2-carbamylethyl) - 3 - methylimidazolium iodide.

EXAMPLES 1–22

In these examples, a number of organoimidazolium salts of different types were used to cure a typical commercial epoxy resin. The epoxy resin employed was that known as "Epon 828," which is a polyglycidyl ether of Bisphenol A made by the reaction of epichlorohydrin with Bisphenol A, having an epoxide equivalent of 175 to 210 and an average molecular weight of 350 to 400. In each case, the epoxy resin was cured using 5 parts of the organoimidazolium salt per 100 parts of the epoxy resin. A second sample was also cured using each organoimidazolium salt in the presence of dicyandiamide, the preferred nitrogenous compound; in these cases, 2 parts of the organoimidazolium salt and 20 parts of dicyandiamide were employed per 100 parts of epoxy resin. Each of the mixtures was heated at 350° F. and the curing time determined as the time in which the resin mixture became hard and impenetratable to a wooden applicator. The results are shown in Table II:

TABLE II

Examples 1 to 22

| Example | Organo-imidazolium salt | Curing time Without dicyandiamide, hours | Curing time With dicyandiamide, minutes |
|---|---|---|---|
| 1 | A | (a) | 4 |
| 2 | B | 1 | 4 |
| 3 | C | 2 | 5 |
| 4 | D | 1 | 4 |
| 5 | E | 1.5 | 5 |
| 6 | F | 15 | 5.5 |
| 7 | G | 1.1 | 3 |
| 8 | H | 21 | 7 |
| 9 | I | 3 | 5.5 |
| 10 | J | 12.5 | 5.5 |
| 11 | K | 2 | 3.5 |
| 12 | L | 3 | 3 |
| 13 | M | 3.5 | 2.3 |
| 14 | N | 1 | 2.5 |
| 15 | O | 8 | 5 |
| 16 | P | 7.5 | 5 |
| 17 | Q | 2 | 4 |
| 18 | R | 4 | 6.5 |
| 19 | S | 1 | 4.5 |
| 20 | T | 21 | 5.5 |
| 21 | U | 12 | 5.5 |
| 22 | V | 22 | 6 | a 40 minutes.

The advantages and unexpected efficiency provided by synergistic action of nitrogenous compounds with organoimidazolium salts as described above was further illustrated by tests in which organoimidazolium salts which cure epoxy resins relatively slowly in the absence of such accelerators were employed with various nitrogenous compounds. These tests were carried out as follows:

EXAMPLES 23–25

Following the procedure of Examples 1–22, the epoxy resin employed in those examples (Epon 828) was blended with 5 parts of an organoimidazolium salt per 100 parts of epoxy resin and the curing time at 350° F. was measured. Similar tests were carried out using corresponding mixtures to which there were added 20 parts per 100 parts of epoxy resin of various nitrogenous compounds. The results are shown in Table III.

TABLE III

| Example | Organo-imidaz-olium salt | Curing time | | | | |
|---|---|---|---|---|---|---|
| | | Salt only | With dicyandiamide | With urea | With thiourea | With diallyl melamine |
| 23 | X | 10 hr | 4 min | 1 hr | 6 min | 21 min. |
| 24 | Y | 25 hr | 6 min | 50 min | 7 min | 19 min. |
| 25 | Z | 25 hr | 7 min | 50 min | 7.5 min | 22 min. |

As indicated, the addition of the nitrogenous compounds drastically reduced the curing time required.

In each of the foregoing examples, the mixture obtained was quite stable at room temperature and was also stable at 100° F. For example, the stability of the various compositions at 100° F. was found to vary from about 11 days to over 160 days; the stability at room temperature was even longer.

In a manner similar to the foregoing examples, other epoxy resins are cured using the curing agents described. For instance, among the epoxy resins of various types which can be substituted for that in the above examples are epoxidized novolak resins, such as reaction products of epichlorohydrin with thermoplastic acid-catalyzed phenol-formaldehyde condensates, e.g. the epoxy resin sold as Kopox 356; other polyglycidyl ethers of aliphatic polyols, such as reaction products of epichlorohydrin with ethylene glycol; epoxidized cycloaliphatic compounds, such as 3,4-epoxycyclohexylmethyl - 3,4 - epoxycyclohexanecarboxylate; epoxidized aliphatic compounds, such as epoxidized oils, such as epoxidized linseed oil.

As mentioned above, the curable epoxy resin compositions of the invention can be used for various purposes. One advantageous use for these materials is as adhesives to bond various materials. They are particularly useful in structural applications wherein they are used to bond metals to each other or to other surfaces; their advantage lies in the extremely high strength of the resulting bonds.

According to the provisions of the patent statutes, there are described above the invention and what are now considered to be its best embodiments. However, within the scope of the appended claims, it is to be understood that the invention can be practiced otherwise than as specifically described.

We claim:
1. A storage-stable curable epoxy resin composition comprising an admixture of a 1,2-epoxy resin and from about 0.1 to about 25 parts per 100 parts of epoxy resin of an organoimidazolium salt of the formula

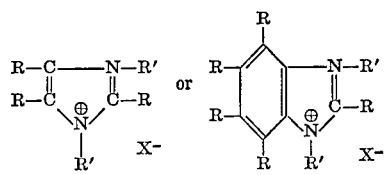

where each R and R' represents hydrogen, alkyl, aryl, substituted alkyl or substituted aryl, at least one R' being other than hydrogen, and X is an anion selected from the group consisting of chloride, bromide, iodide, sulfate and phosphate.

2. The composition of claim 1 in which the epoxy resin is a polyepoxide having a 1,2-epoxy equivalency of greater than 1.0.

3. The composition of claim 1 in which said epoxy resin is a polyglycidyl ether of a polyhydric compound.

4. The composition of claim 3 in which said polyhydric compound is bisphenol A.

5. The composition of claim 1 in which both groups represented by R' are other than hydrogen.

6. The composition of claim 1 containing as an additional component a nitrogenous compound selected from the group consisting of triazines, diazines, triazoles, guanadines, guanamines, and alkyl and aryl substituted derivatives thereof.

7. The composition of claim 6 in which said nitrogenous compound is selected from the group consisting of dicyanamide, urea, thiourea and diallyl melamine.

8. The composition of claim 6 in which said nitrogenous compound is present in an amount between about 0.1 and about 35 parts per 100 parts of epoxy resin.

9. A cured epoxy resin product produced by heating the composition of claim 1 to a temperature between about 200° F. and about 500° F.

10. A cured epoxy resin product produced by heating the composition of claim 6 to a temperature between about 200° F. and about 500° F.

References Cited

UNITED STATES PATENTS 3,356,645  12/1967  Warren _____ 260—47 EP

OTHER REFERENCES

Imidazoles: Preliminary Data Bulletin, Houdry Corp. (pp. 1–12), April 1959.

Handbook of Epoxy Resins, by Lee et al. (pp. 9–5; 9–8), 1967.

WILLIAM H. SHORT, Primary Examiner

T. E. PERTILLA, Assistant Examiner

U.S. Cl. X.R.

117—161 ZB; 161—186 R; 260—2 N, 18 EP, 59 R, 88.3 A, 830 TW